April 21, 1970    D. L. MacDUFFEE ET AL    3,508,032
PRINTER HAVING COMBINED DATA INPUT AND AUTOMATIC
DOCUMENT FEED MECHANISM Filed June 27, 1967          3 Sheets-Sheet 1

INVENTORS
DAVID L. MAC DUFFEE
JOSEPH R. STEWART

BY *E. Ronald Coffman*
ATTORNEY

United States Patent Office 3,508,032
Patented Apr. 21, 1970

3,508,032
PRINTER HAVING COMBINED DATA INPUT AND AUTOMATIC DOCUMENT FEED MECHANISM
David L. MacDuffee, Lexington, Ky., and Joseph R. Stewart, Rockville, Md., assignors to International Business Machines Corporation, Armonk, N.Y., a corporation of New York
Filed June 27, 1967, Ser. No. 649,163
Int. Cl. G06k 7/08; B41j 13/00
U.S. Cl. 235—61.11
7 Claims

ABSTRACT OF THE DISCLOSURE

Accounting documents are automatically fed to a posting position by mechanism responsive to the physical location of "old balance" data recorded on a magnetic stripe portion of the document. The "old balance" data is recorded at a different physical location on the magnetic stripe each time the account is updated to condition the document for automatic new line positioning during a subsequent reinsertion.

DISCLOSURE OF THE INVENTION

This invention is useful wherever a working document, such as a ledger card, is required to carry a relatively small amount of variable data in so-called "machine readable" form, and is further required to carry successive individual, typed or "human readable" entries thereon.

Accounting machines and computer systems are known to employ unit records such as ledger cards that carry both typed and machine readable information. The typed information may show both individual transactions and the account status. The machine readable information is usually in the form of a magnetic recording or a coded pattern of punched holes to provide account status data in a form to be read automatically into the accounting machine or computer just prior to modifying or updating the account status. It is quite common to also provide a physical indication of the first available typing line on the document, to facilitate automatic positioning of the record for a subsequent entry, by a punched hole or magnetic mark specific for that purpose.

Heretofore, the structure and functions provided for handling machine usuable information and for automatically positioning the record have been maintained substantially separate. By a principal phase of this invention, both of these functions are obtained from the same recording on a magnetic stripe. The account information is recorded in a short length of approximately one inch on a document stripe of approximately 10 inches total length by utilization of a high density, double frequency, or self-clocking bit pattern. Such data is read from the stripe as the document is fed into the printer. The physical location of the short length bit pattern on the stripe controls the document feed mechanism to terminate the feed as required to position the document at the first available printing or typed entry line.

After the account has been updated, either manually or automatically, and a new status has been printed on the document, the document is fed out of the printer and a new information bit pattern is recorded on the magnetic stripe at a new physical location, thereby indicating a new "first available" printing line for a subsequent updating operation. This mechanism is made particularly efficient by eliminating any need for the document to feed the entire length of the magnetic stripe in order to read and write the magnetic bit pattern.

These and other features, objects, and advantages of our invention will be apparent to those skilled in the art upon reading the following more specific description of a preferred illustrative embodiment of our invention, wherein reference is made to the accompanying drawings, of which:

FIGURE 8 is a sequential operation diagram illustrating the progressive advance of recorded data with successive entries.

Figures 1, 2:
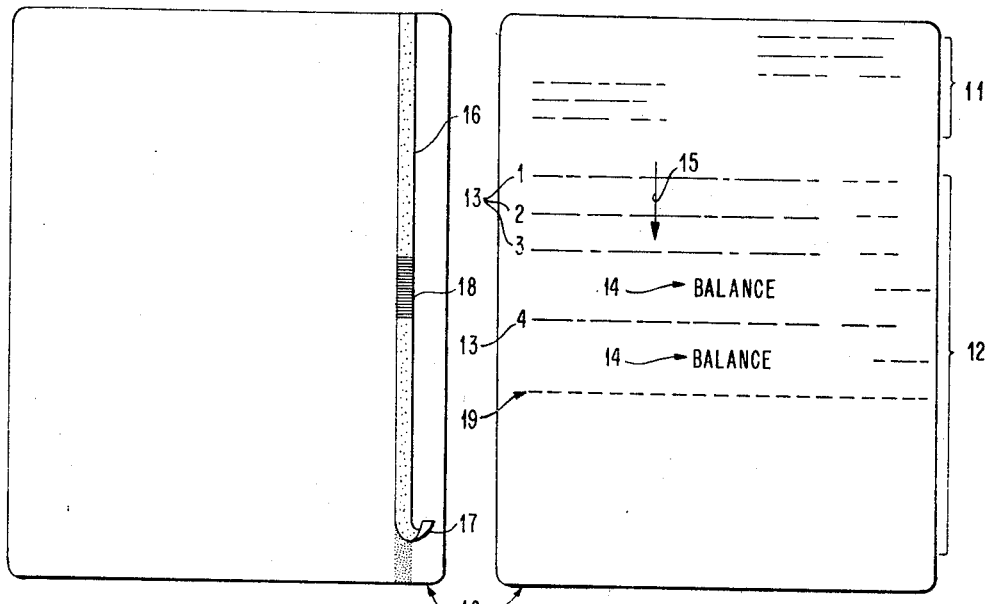
FIGURES 1 and 2 are respectively the rear and front views of a typical accounting document of the type useful in our invention.

Referring now more specifically to the drawings, a typical accounting document such as a ledger card or other printable record 10 is shown in FIGURES 1 and 2. The front of card 10, (FIGURE 2) includes a heading portion 11 and a working or transaction data portion 12. Successive or sequential entries 13 and status information such as balance FIGURES 14 are entered in working portion 12 progressively in the direction of arrow 15. The card 10 thus provides information as to past transactions as well as the current account status in human readable form.

The back or reverse side of card 10 (FIGURE 1) includes a magnetically recordable stripe 16 that is preferably provided by attaching a piece of commercial magnetic tape 17 by adhesive to the card 10 as magnetic tape is known to have better high density recording performance than conventional printed magnetic tracks. The stripe 16 extends longitudinally in the progressive entry direction 15 and thus it can be scanned upon motion of the card 10 as it feeds to and from one of the sequential data entry locations 13. As more fully explained hereinafter, the magnetic stripe 16 has a short length recorded portion 18 thereon that serves both to provide data as to the account status in machine readable form to facilitate automatic account updating, and to provide a positional indication of the next free printing or posting line such as 19 in FIGURE 1. The recorded portion 18 is read into an associated computing device as the card 10 moves into the printer. Upon ejection of the card from the printer after account updating, new data is recorded on the stripe 16 in place of the old data, and in a new location as required to indicate a new free printing line.

Figure 3:
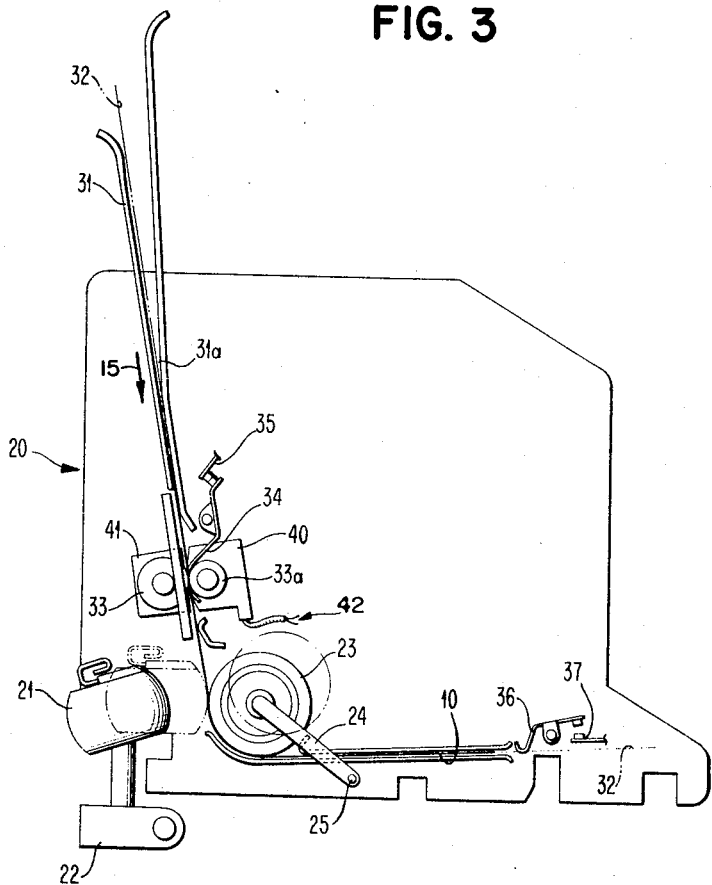
FIGURE 3 is a simplified side elevational view of a printer constructed in accordance with our invention.

FIGURE 3 shows a front feed, single element record printer 20 with which my invention is particularly useful. Many details of construction of the printer 20 are similar to those shown more fully in U.S. Patent 3,294,956 entitled, "Magnetic Ledger Card Machine," issued Dec. 27, 1966, to C. S. Jenkins and N. K. Perkins. For this reason duplicate details will not be repeated herein.

The printer 20 principally includes a spherical print element or character matrix 21 mounted on a letter feed carrier 22 and cooperates with a platen 23 to print individual characters on cards or paper positioned therebetween. Platen 23 is mounted on side arms 24 for pivotal movement about an axis 25 to the broken line position shown to facilitate insertion of accounting cards from a front chute 31. The platen 23 is maintained in its lifted or broken line position during feed-in and feed-out of the card 10, and is moved to its full line or printing position only after the card has been otherwise properly positioned. Chute 31 provides a throat 31a for guiding cards in the progressive entry direction 15 along a record path 32 past primary feed means comprising a pair of laterally extending feed rolls 33 and 33a.

A magnetic transducer or read-write head 40 and suitable back-up pressure plate 41 therefor are mounted at one side of the feed rolls 33 and 33a in alignment with the path of stripe 16 of the card 10 as it is fed by the chute 31 into printing position between the print element 21 and the platen 23.

A card sensing finger 34 operates a switch 35 to indicate the presence of a card 10 in the feed rolls 33 and 33a. Preferably two sensing fingers 34 are provided at each lateral side of the feed rolls 33 and 33a to indicate the presence of the card only when the card is properly aligned.

Sensing finger 36 operates a first line switch 37 to indicate that a card has been fed past the working zone as will occur upon insertion of a new, unrecorded card. Switch 37 controls the record feed to position a new card 10 at its first printing line.

Figure 4:
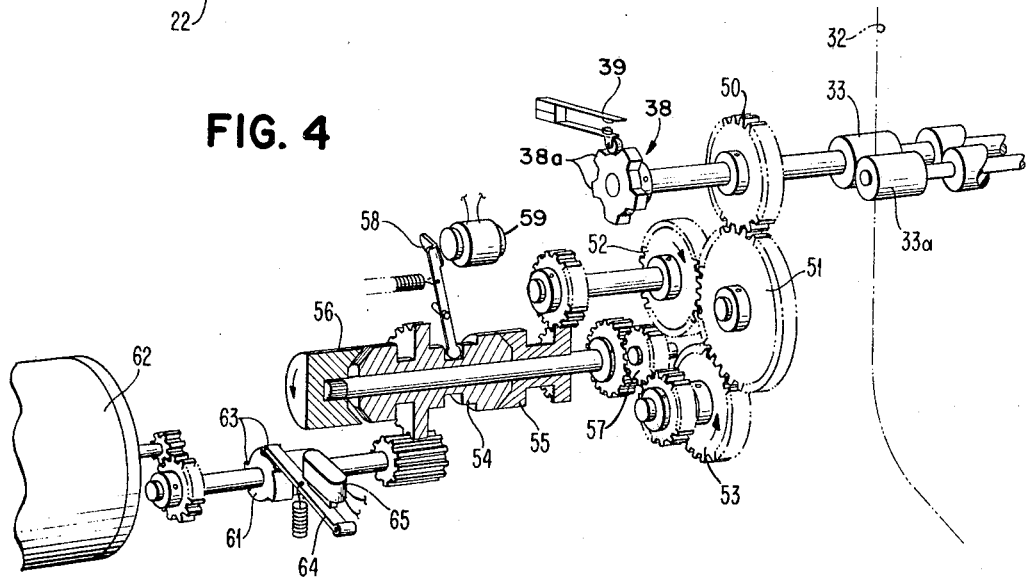
FIGURE 4 is a perspective view of the document feed drive transmission for implementing the concepts of our invention.

FIGURE 4 shows the transmission and drive mechanism for operating the feed rolls 33 and 33a to drive a card along path 32 variable distances into and out of a printing position. Feed roll 33 is connected to a gear 50 that meshes with a transfer gear 51 which is in turn driven by either a forward of feed-in pinion 52 or a reverse or feed-out pinion 53.

Selection of forward and reverse drive is accomplished through mechanism somewhat similar to that disclosed in aforesaid U.S. Patent 3,294,956. The mechanism includes an axially shiftable drive or input member 54 that is alternately connectable to either a forward or reverse output member 55 or 56 respectively, to transmit rotation thereto. Forward output member 55 is geared directly to pinion 52 whereas reverse output member 56 is geared to pinion 53 through a reversing idler gear 57. A spring biased control arm 58 normally places input member 54 in the forward drive position as shown. Electromagnet 59, or other selectively operable actuating means, moves control arm 58 to its other position when feed-out is desired.

Control of drive motion itself is accomplished through a conventional spring clutch having a five-position control arbor 61 to provide for selective drive engagement between a motor or rotational energy source 62 and the input member 54 to the feed roll drive transmission. One of five latching or arresting surfaces 63 of the control arbor 61 is normally engaged by a spring biased latch 64 to positively position the feed roll 33 at a writing line location. The clutch is engaged by release of its arbor 61 from latch 64 upon operation of feed start electromagnet 65. Deactivation of electromagnet 65 permits latch 64 to re-engage control arbor 61 and arrest the feed roll 33 at a printing line. A feed roll position emitter 38 comprising cam lobes 38a for operating a switch 39 correlates control of clutch arbor 61 with the position of feed rolls 33.

Figure 9:
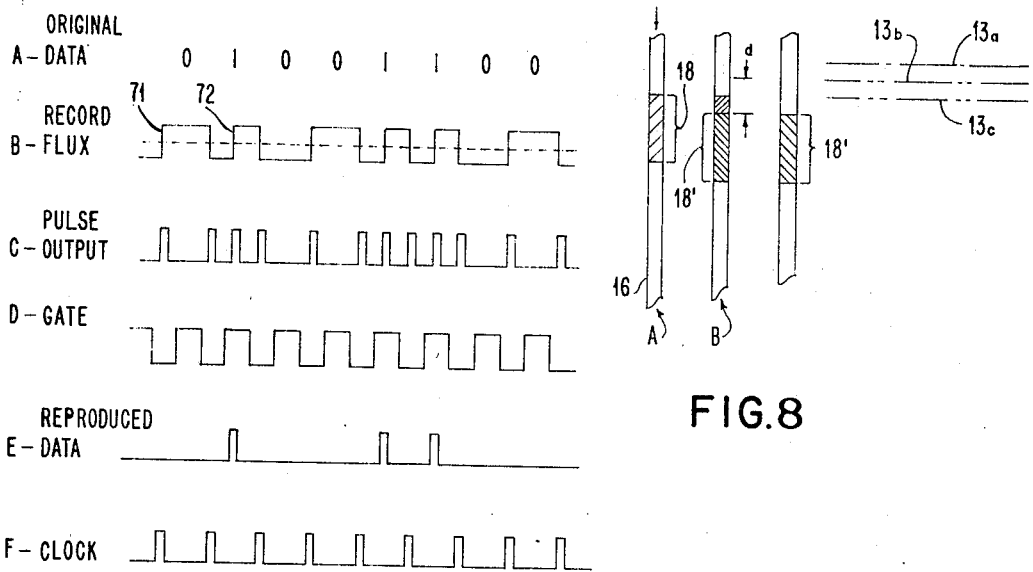
FIGURE 9 is a graphical illustration of a preferred recording pattern and its fundamental characteristics.
Figure 5:
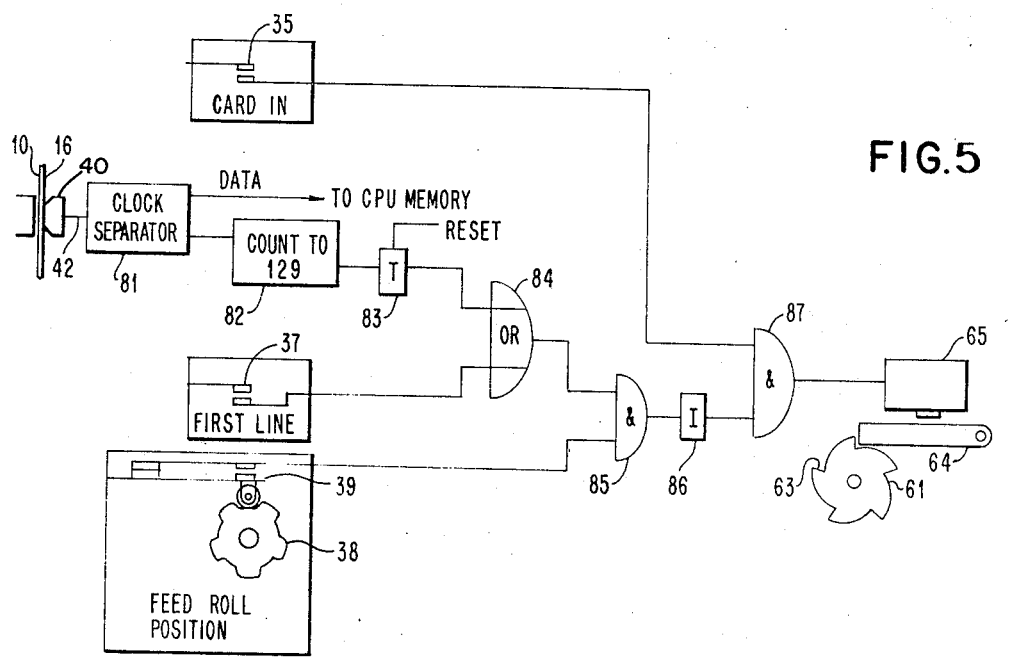
FIGURE 5 is a diagrammatic view of the means for controlling feed-in operation of the document feed transmission shown in FIGURE 4 in response to the physical location of recorded data thereon.

Before proceeding to the control system for the feed mechanism thus described, it will be useful to describe a preferred recording method employed in our invention. The recording method is illustrated graphically in FIGURE 9 and is referred to generally as a self-clocking method and preferably is a double frequency recording method. A full description of the method may be found in an article entitled, "High-Density Recording on Magnetic Tape" published Oct. 16, 1959, in "Eletcronics," pages 72 thru 75 by McGraw Hill Publishing Company. It is characterized principally in the combining of clock or synchronizing pulses with data pulses in a single track. In part A of FIGURE 9, a typical data sequence of "ones" and "zeros" is shown. Part B shows the self-clocking bit pattern of magnetic flux changes representative of the data in part A using a double frequency recording method. Note that a flux change occurs upon each clock pulse or timing signal, e.g. 71, as well as upon each "one" of the data recorded, e.g., 72. Data flux changes occur midway between clock flux changes. The record 18 shown in FIGURE 2 is of fixed length, i.e. has a predetermined number of clock bits or flux changes. One hundred twenty-nine clock bits for example permit recording of thirty-two four-bit digits as might be adequate to contain old balance data for rountine accounts. Part C of FIGURE 5 shows a pulse train as produced after reading the flux changes of part B. Note that a pulse exists corresponding to each change of state of the record shown in part B. The train of pulses in part C can be separated by a gating pulse train shown in part D the upgoing pulses of which start in delayed synchronism with each clock pulse received. If the upgoing pulses of the gate pulse train are employed in AND logic with the pulse train of part C, the data pulses will be reproduced as an output as shown in part E. On the other hand, if the downgoing pulses in the gate pulse train are inverted and combined in AND logic with the pulse train of part C, an output of clock pulses will be produced as shown in part F.

The control system for operating the mechanism of FIGURES 3 and 4 in the read or card feed-in mode is shown schematically in FIGURE 5. Specific details of circuits or mechanisms are not shown as it is completely within the state of the art to provide circuitry for implementing the system described.

In FIGURE 5, the card 10 and its stripe 16 are shown in cooperating relationship with transducer 40. Clutch control arbor 61, the clutch latch 64 and the clutch control electromagnet 65 are shown in their normal, non-feed condition. The feed roll position emitter 38, card-in switch 35 and first line switch 37 are all shown in their normal condition. The transducer 40 receives both data and clock pulses from the record 18 on stripe 16 and transmits all pulses over a substantially unitary electrical path 42 to a clock separator 81. By methods described in conjunction with FIGURE 9, clock separator 81 delivers data pulses serially-by-bit to a data handling device such as a computer memory by suitable memory control and distribution circuitry not shown, and delivers clock pulses to a record position sensing counter 82. For reasons hereinafter more apparent, the counter 82 effectively senses the position of the first recorded flux change of the predetermined length record by counting the one hundred twenty-eight prior clock pulses. The output of counter 82 is stored temporarily in a resettable trigger 83. In parallel with the counter 82 is the first line switch 37 which is effective to control record positioning where no previously recorded information exists on the stripe 16. The output of counter 82 and of first line switch 37 are connected through OR logic 84 to AND logic 85. AND logic 85, to be satisfied, also requires a closing of emitter switch 39 indicating a proper time to drop the clutch control latch 64 to terminate feed at a subsequent printing line position. The output of AND logic 85 is connected through inverter logic 86 to on-off AND logic 87 to provide the "terminate feed" control signal for clutch electromagnet 65.

The operation of the control system shown in FIGURE 5 is as follows: Insertion of a card 10 into chute 31 (FIGURE 3) closes contact 35 (FIGURE 5) and, since neither first line switch 37 nor counter 82 are emitting outputs, AND logic 87 is thereby satisfied, and magnet 65 is activated to lift latch 64 and permit clutch 61 to engage the drive train of FIGURE 4 with motor 62. Recall that the drive train control arm 58 is normally in a forward feed position. If the card has no previously recorded information on stripe 16, it will feed until its leading edge closes first line switch 37 to satisfy one half of the conditions required for AND logic 85. The feed rolls 33 and 33a continue to move until emitter switch 39 closes at which time AND logic 85 is satisfied and through inverter 86 frustrates AND logic 87 to deactivate electromagnet 65. Clutch latch 64 drops to intercept clutch arbor 61 at the next succeeding latching surface 63. On the other hand, if the card 10 has previously recorded information 18 on the magnetic stripe 16, such information is received by the clock separator 81 when encountered by the transducer 40 during the feed-in movement of card 10. Data is transmitted to the computer memory and the clock pulses are transmitted to the counter 82. Counter 82 accumulates the clock pulses until a count of 129 is reached at which time an output is emitted and is stored by trigger 83. The output passes through OR logic 84 to AND logic 85. Subsequent closing of emitter switch 39 satisfies AND logic 85 and frustrates AND device 87 to terminate the feed-in operation. Under some circumstances it may be desirable to delay deactivation of electromagnet 65 for several line spaces after the end of the record 18 has been read. Such delay can be readily effected by insertion of an appropriate counter between AND logic 85 and inverter logic 86.

Figure 6:
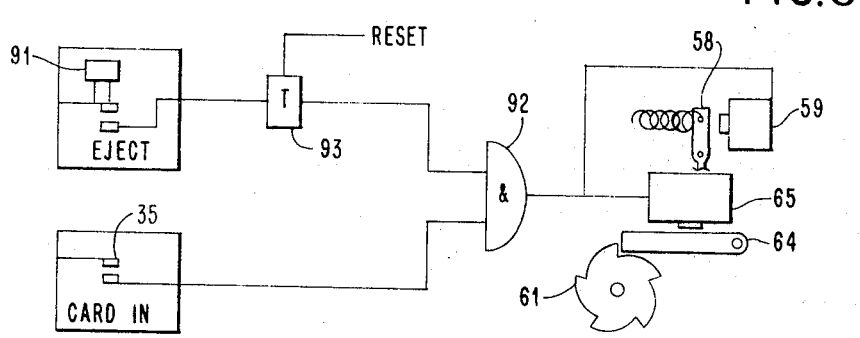
FIGURE 6 is a diagrammatic view of the means for controlling feed-out operation of the document feed transmission shown in FIGURE 4.
Figure 7:
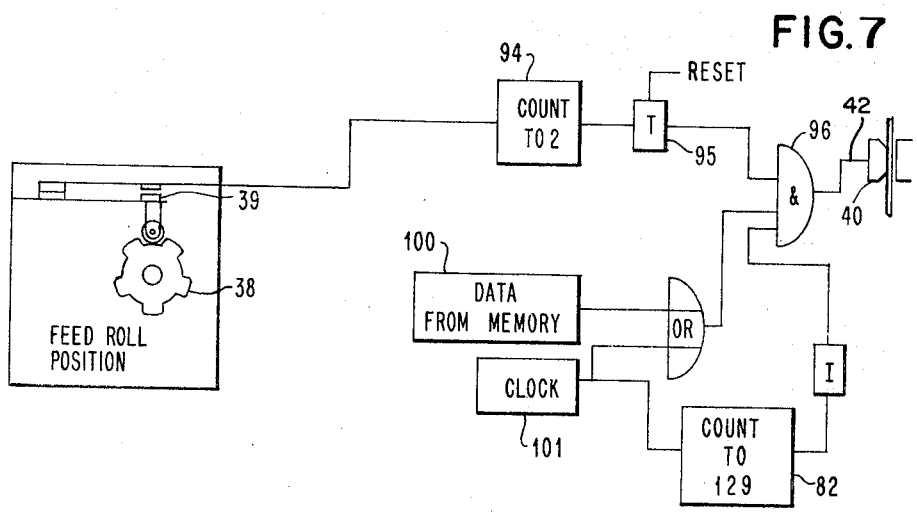
FIGURE 7 is a diagrammatic view of the means for controlling a recording operation during feedout of a document whereby the physical location of such recording is indicative of the next available posting line on the document.

The control system for operating the mechanism required to implement FIGURES 3 and 4 in the write or card feed-out mode is shown schematically in FIGURES 6 and 7. Feed-out operation of the record is initiated by an appropriate start signal either from a computer instruction or by depression of an eject key 91 which, in conjunction with the card-in switch 35, satisfies AND logic 92 to activate the reverse feed control electromagnet 59 (FIGURE 4) and pick drive control electromagnet 65 to initiate record feed-out movement. A resettable trigger or electronic storage device 93 is inserted between the eject key 91 and AND logic 92 to maintain the ejection operation after key 91 has been released. Emitter switch 39 measures line space movements of the feed rolls 33 and 33a and is connected to a counter 94 that emits an output upon counting two successive outputs from emitter switch 39. A trigger or electronic storage device 95 retains the output from counter 94 and applies it to AND logic 96 to gate data from the computer memory 100 and clock pulse source 101 to the transducer 40 and initiate recording. Recording is terminated after 129 clock pulses have been recorded by means of counter 82 which is connected to control AND logic 96. The count of two is made up of the one line space through which the record will be moved during a subsequent feed-in operation after the count of 129 has been attained, as well as the one line space it is desired that the record be advanced to provide a new printing line. It will be seen that the initial recording thus will appear on the stripe 16 one line space displaced from the previous recording.

The advancement of the record portion 18 is shown more clearly in FIGURE 8 which shows three views of a typical record stripe 16 in successive positions. Record portion 18 in part A of FIGURE 8 corresponds to information on printing line 13a and contains the standard 129 clock bits. During feed-in motion, record 18 is read, the 129th clock pulse is counted, emitter switch 39 closes, clutch latch 64 is dropped and the record will halt at a printing line 13b. Upon ejection from the printer 20, the reversing electromagnet 59 and drive electromagnet 65 are activated and emitter switch 39 indicates two line space increments of motion (see dimension d) before gating data and clock pulses to the transducer 40 for recording. The data to be transmitted includes 129 clock pulses which will be recorded in a new data segment 18' that is identical in length to the original data segment 18, but as shown in FIGURE 8, part B, is displaced one line space therefrom. When the card is again reinserted, counting by counter 82 will begin with the leading or lower edge of the data segment 18' and upon counting 129 clock pulses and receiving a signal from emitter 38, clutch latch 64 will again be dropped, this time terminating the feed at an advanced line 13c. Thus it can be seen with succeeding updating operations of the record, the data segment 18 will progress down the record stripe 16 to serve as a future control of feed-in of the record. Also, it will be recognized that line by line feeding is not necessary and that a record update operation could involve feeding of two or three lines. For example, if a record were updated by adding three transactions occupying three lines, ejection of the record would be accompanied by recording beginning at an appropriate location with respect to the last record entry line and the record upon reinsertion would automatically be positioned as described above.

Those skilled in the art will recognize that we have provided a combined data storage and record positioning system. It will be further recognized that our invention is not limited to the specific implementations shown and the various additions, deletions and modifications can be made thereto without departing from our inventive concepts as defined in the appended claims.

We claim:
1. Information handling apparatus useful with a printable record for receiving sequential entries thereon and having a magnetically recordable stripe extending substantially normal to said sequential entries, said apparatus having a record printer, feed means for moving the record along a path extending substantially normal to said sequential entries into and out of an operative position in the printer, a memory device for providing a source of variable data, and electromagnetic transducer means cooperatively positioned adjacent said path for scanning the stripe during record feeding movement wherein the improvement comprises:

means cooperative with said memory device for controlling said transducer means during feed-out of said printer for recording a retrievable representation of said variable data on said stripe at a location geometrically related to the last of said sequential entries and within a length that is short relative to the total length of said stripe, means responsive to the location of said recorded data on said stripe for controlling said feed means during record feed-in of said printer to position the record at the next succeeding data entry location thereon, data handling means responsive to said variable data for performing a function other than controlling said feed means during record feed-in of said printer, and circuit means operatively connected with said transducer during record feed-in of said printer for delivering said variable data to said data handling means.

2. Apparatus as defined in claim 1 wherein
said read-write control means includes means for initiating recording of said variable data by said transducer means after predetermined feed-out motion of the record, and
said feed controlling means includes means responsive to reading of said initial recording by said transducer means for terminating feed-in movement of the record.

3. Apparatus as defined in claim 2 and further comprising:
means for indicating uniform line space increments of record motion,
said recording initiating means including means for sensing a predetermined number $n$ of said linespace increments to measure said predetermined record feed-out motion, and
said feed control means including means for arresting feed-in movement of the record upon $n-1$ increments of record movement after sensing said initial recording.

4. Apparatus as defined in claim 2 wherein
said retrievable representation of said variable data is recorded in a self-clocking bit pattern having an invariable predetermined number of clock bits, and
said initial recording responsive means comprises means for counting said clock bits during record feed-in and means for terminating feed-in movement of the record after attainment by said counting means of said predetermined number of clock bits.

5. Apparatus as defined in claim 3 wherein
said retrievable representation of said variable data is recorded in a self-clocking bit pattern having an invariable predetermined number of clock bits, and
said initial recording responsive means comprises means for counting said clock bits during a record feed-in and means for terminating feed-in movement of the record after attainment by said counting means of said predetermined number of clock bits.

6. Apparatus as defined in claim 2 wherein said feed and feed control means comprise:
a source of rotational energy,
feed rolls for drivingly engaging the record,
clutch means for connecting said feed rolls to said source of rotational energy, said clutch means including a control arbor having arresting surface means for positively defining successive record lines,
control latch means selectively engageable with said latching surface means for arresting said feed rolls at line space locations of the record and alternately disengageable therefrom for permitting clutch engagement between said energy source and said feed rolls, and
means for disengaging said control latch from said control arbor in response to the initial presence of a record at said feed roll.

7. Apparatus as defined in claim 4 further including a unitary electrical path leading from said transducer means for conducting a composite signal comprising both data and clock bits thereto and therefrom.

References Cited

UNITED STATES PATENTS

| | | |
|---|---|---|
| 2,936,870 | 5/1960 | Schmidt. |
| 3,146,342 | 8/1964 | Perotto. |
| 3,294,956 | 12/1966 | Jenkins et al. _____ 235—61.9 |
| 3,348,027 | 10/1967 | Wallace et al. _____ 235—61.9 |
| 3,356,021 | 12/1967 | May et al. |

DARYL W. COOK, Primary Examiner

T. J. SLOYAN, Assistant Examiner

U.S. Cl. X.R.

197—127